United States Patent [19]

Thuries et al.

[11] Patent Number: 5,693,873
[45] Date of Patent: Dec. 2, 1997

[54] METHOD AND A SYSTEM FOR DETERMINING THE DENSITY OF AN INSULATING GAS IN AN ELECTRICAL APPARATUS

[75] Inventors: Edmond Thuries, Meyzieu; Jean-Pierre Dupraz, Lyons, both of France

[73] Assignee: GEC Alsthom T & D SA, Paris, France

[21] Appl. No.: 598,192

[22] Filed: Feb. 7, 1996

[30] Foreign Application Priority Data

Feb. 8, 1995 [FR] France ................... 95 01440
May 17, 1995 [FR] France ................... 95 05853

[51] Int. Cl.$^6$ .................................................. G01N 7/00
[52] U.S. Cl. ................................... 73/23.28; 73/30.01
[58] Field of Search .......................... 73/23.28, 23.29, 73/25.01, 30.01, 30.02; 340/632

[56] References Cited

U.S. PATENT DOCUMENTS

| | | | |
|---|---|---|---|
| 3,916,445 | 10/1975 | Alliston et al. | 441/1 |
| 4,616,324 | 10/1986 | Simmel | 364/483 |
| 4,631,625 | 12/1986 | Alexander et al. | 361/94 |
| 4,864,286 | 9/1989 | Ohsita et al. | 340/644 |
| 5,115,371 | 5/1992 | Triipodi | 361/106 |
| 5,388,451 | 2/1995 | Stendin et al. | 73/30.02 X |
| 5,410,908 | 5/1995 | Erichsen | 73/31.05 |
| 5,421,190 | 6/1995 | Brandle et al. | 73/30.01 |
| 5,502,435 | 3/1996 | Ralston | 340/632 |

FOREIGN PATENT DOCUMENTS

2607158A1 8/1977 Germany.
2714384A1 10/1978 Germany.

*Primary Examiner*—Hezron E. Williams
*Assistant Examiner*—Jay L. Politzer
*Attorney, Agent, or Firm*—Sughrue, Mion, Zinn, Macpeak & Seas, PLLC

[57] ABSTRACT

A method and a system for determining the density of an insulating gas in electrical apparatus in the vicinity of parts carrying electrical current, the method comprising the following steps:

a) a reference temperature is measured outside the apparatus and in the vicinity thereof;

b) the current passing through the apparatus is measured, and the temperature rise of the gas above the reference temperature is determined on the basis of gas temperature rise values as a function of current values and of various reference temperatures, said temperature rise values having been previously determined by testing or by a mathematical model;

c) the gas temperature is computed by adding the reference temperature and the temperature rise;

d) the gas pressure inside the apparatus is measured; and e) the density $\rho$ of the gas is computed on the basis of equations of state of the gas $\rho=F(T,P)$ which equations are tabulated data.

8 Claims, 3 Drawing Sheets

METHOD AND A SYSTEM FOR DETERMINING THE DENSITY OF AN INSULATING GAS IN AN ELECTRICAL APPARATUS

The present invention relates to a method and to a system for determining the density of an insulating gas in an electrical apparatus.

BACKGROUND OF THE INVENTION

Electrical apparatuses, such as conventional circuit breakers on insulating columns made of porcelain or of synthetic insulating materials, and also stations in grounded metal cases, said to be "metal-clad", often use an insulating gas having good dielectric properties, such as sulfur hexafluoride whose chemical formula is $SF_6$.

The various characteristics of such apparatuses, such as their interrupting power or their dielectric behavior depend on the density of the insulating gas. As laid down by standards, they are tested for interrupting power, dielectric behavior, etc. at the minimum density guaranteed by the manufacturer, e.g. 30 kg/m³ for $SF_6$.

To monitor the density of the insulating gas and detect its minimum threshold for proper operation, each apparatus or compartment containing the gas is fitted with a gas density measuring device called a "densimeter". Densimeters may operate on various different physical principles, e.g. variation in the frequency of oscillation of a crystal or deformation of a membrane, associated with a computed temperature compensation, or indeed a pressure comparison performed with a reference volume that is filled with the same gas. The above list is not limiting.

Proper operation of such densimeters assumes that they are at the same temperature as the gas whose density they are intended to measure. It is known that the density ρ of a gas is associated with its temperature T and its pressure P by a relationship:

$$\rho = F(T,P)$$

Any percentage error in T Gives rise to an equal percentage error in ρ at given pressure P.

For conventional circuit breakers mounted on insulating columns, densimeters are nearly always installed at the bottom of the columns. Although pressure is substantially the same at this location as it is in the interrupting chambers, given that pressures always equalize between volumes that are in communication, temperature at this location is considerably lower than in the interrupting chamber when the chamber is conveying its nominal current.

A similar situation exists with metal-clad stations. With them also, it is the general rule for densimeters to be installed on the outside surface of the metal cases. As in the above case, the cases are considerably cooler than the interrupting members or the bus bars they contain. A temperature gradient is established between the centers of such apparatuses and their outside walls. As in the above case, the same pressure exists throughout the volume, but since the temperatures are different, the gas does not have the same density throughout. Density is smaller towards the center, where parts are at a higher temperature, than it is near the outside.

By way of example, it is common for the interrupting chamber of a conventional circuit breaker that is conveying its load current to contain gas at a temperature that is 30° C. higher than ambient temperature. Assuming that ambient temperature is 20° C. or 293K, the error in the measured density is about 10%. For a threshold pressure of 5 bars at 20° C., the error in pressure terms is 500 millibars.

Given that interrupting power, e.g. on a line fault, is sensitive to pressure adjustments of about 100 millibars, and given the need to avoid overdimensioning apparatuses, manufacturers specify pressure measuring devices whose accuracy, in absolute terms, is to within at least 50 millibars, so it can be seen that an error of 500 millibars is too great.

OBJECTS AND SUMMARY OF THE INVENTION

An object of the present invention is to define a method of computing the density of a gas in an inaccessible zone of an electrical apparatus, with good accuracy, matching specifications or imposed standards.

The invention provides a method of determining the density of an insulating gas in electrical apparatus in the vicinity of parts carrying electrical current, the method comprising the following steps:

a) a reference temperature ($T_{ref}$) is measured outside the apparatus and in the vicinity thereof;

b) the currents flowing through the phases of the apparatus, which are represented by ($I_A$, $I_B$, $I_C$), are measured, and the temperature rise ($\Delta T$) of the gas above the reference temperature is determined on the basis of gas temperature rise values as a function of current values and of various reference temperatures, said temperature rise values having been previously determined by testing or by a mathematical model;

c) the gas temperature (T) is computed by adding the reference temperature ($T_{ref}$) and the temperature rise ($\Delta T$);

d) the gas pressure (P) inside the apparatus is measured; and e) the density ρ of the gas is computed on the basis of equations of state of the gas ρ=F(T,P), which equations are tabulated data.

When the apparatus is associated with a circuit including section switches, it is possible to provide a correction for the temperature rise value ($\Delta T$) to take account of the open or closed state of the section switches.

The temperature rise value ($\Delta T$) is corrected to take account of weather conditions (wind or snow).

The invention also provides a system for determining the density of an insulating gas in electrical apparatus in the vicinity of parts conveying current, the system comprising:

a temperature sensor placed in the vicinity of the apparatus and delivering a reference temperature ($T_{ref}$);

a device for measuring the currents ($I_A$, $I_B$, $I_C$) passing through the apparatus;

links for conveying the reference temperature value ($T_{ref}$) and the current values ($I_A$, $I_B$, $I_C$) to a microprocessor programmed to provide the temperature rise ($\Delta T$) of the gas above the reference temperature as a function of the current values and for various reference temperatures, such temperature rise values having been previously determined by tests or by a mathematical model, the microprocessor being programmed to add together the reference temperature ($T_{ref}$) and the temperature rise value ($\Delta T$) in such a manner as to obtain the corrected temperature value (T) of the gas;

a device for measuring the pressure (P) of the gas in the apparatus;

a link for conveying the value (P) of the pressure in the apparatus to the microprocessor, the microprocessor being programmed to provide the value (ρ) of the density of the gas on the basis of the equations of state for the gas which are stored in a memory of the microprocessor; and signalling and alarm means operated by the microprocessor whenever the computed value for the density drops to one or more threshold values.

Optionally, the system further comprises an apparatus image temperature probe placed close to the apparatus and providing output to the microprocessor to enable it to apply a correction to the calculated density value.

Advantageously, the microprocessor is programmed to inhibit operating the alarm and signalling means for a determined length of time whenever the value of the current increases suddenly from a given value.

The pressure-measuring device is a sensor associated with a temperature-compensated electronic circuit.

In a variant, the pressure-measuring device is under thermostatic control.

BRIEF DESCRIPTION OF THE DRAWINGS

An implementation of the method is described with reference to the accompanying drawings, in which.

MORE DETAILED DESCRIPTION

Figure 1:
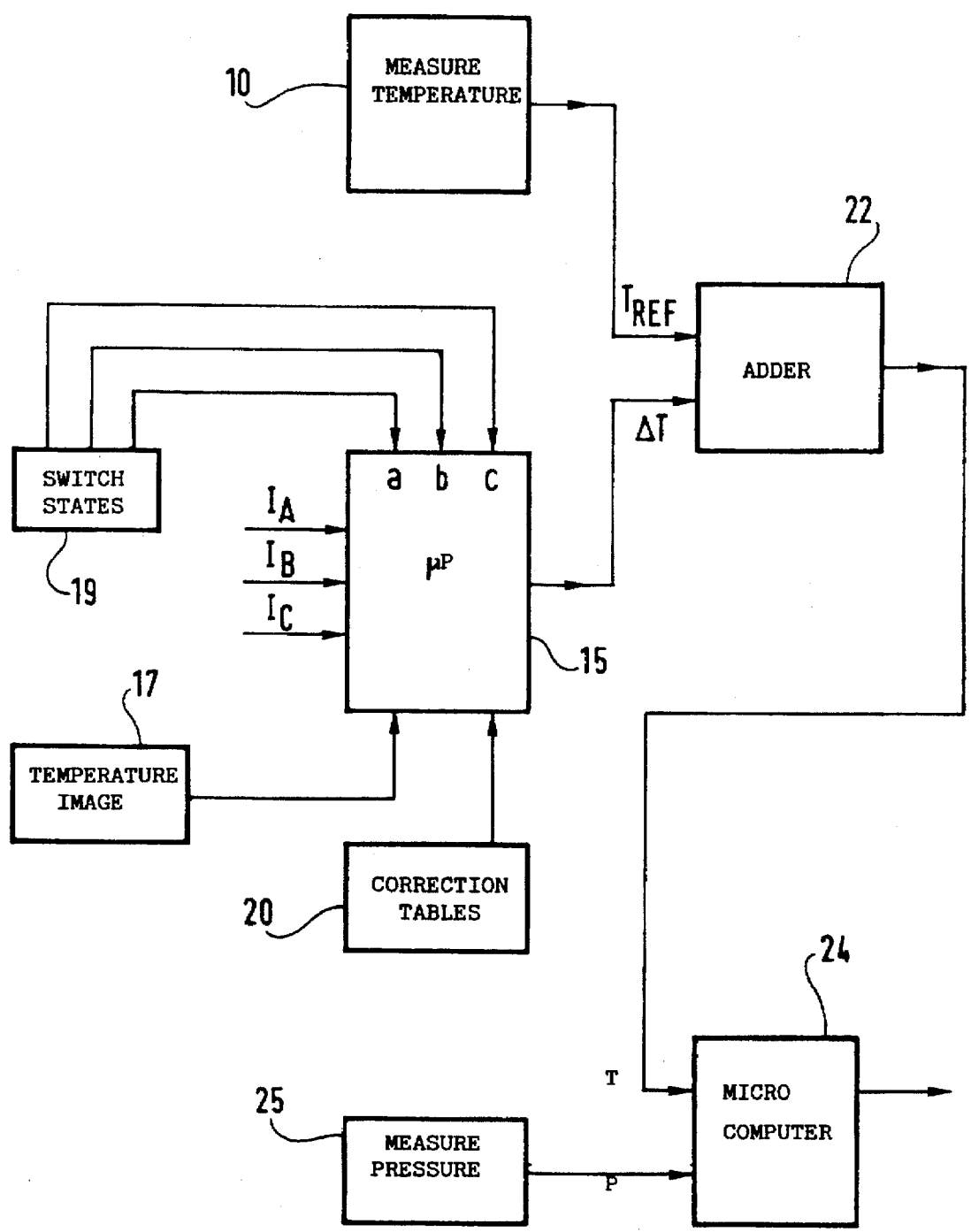
FIG. 1 is a block diagram of the method of the invention for determining the density of gas in an inaccessible zone inside an electrical apparatus.

In FIG. 1, reference 10 designates a temperature-measuring member; as already mentioned, this member is placed as close as possible to the volume that is to be monitored (in metal-clad type equipment, the temperature-measuring member is placed in the vicinity of the metal case; for a circuit breaker of conventional type placed on insulating columns, the member is placed to measure the ambient temperature that exists around the columns of the circuit breaker, in general at the bottoms of the columns). The temperature measured by the member 10 is referred to below as $T_{ref}$ (for reference temperature).

Reference 15 designates a microprocessor programmed to compute the temperature rise ΔT of the gas, i.e. the difference between the temperature within the apparatus in the vicinity of the conductors and the reference temperature.

The microprocessor receives the values $I_A$, $I_B$, and $I_C$ of the currents flowing through the various phases of the apparatus (if the apparatus is constituted by three identical single-phase elements, a single current value is used, e.g. the highest). The memory of the microprocessor contains values for temperature rise as a function of values for the currents, and this is done for various values of reference temperature. These temperature rise values are obtained either by factory testing of the apparatus or by means of a mathematical model.

The computation of temperature rise can be further improved by taking account of the open or closed positions of section switches associated with the apparatus, since temperature rise can vary depending on the state of the section switches. A sensor 19 provides the microprocessor with the states of the various section switches a, b, and c, and the microprocessor selects a correction table corresponding to the overall state of the apparatus from a set of correction tables 20.

The value ΔT of the temperature rise is applied to an adder 22 which computes the temperature T of the gas within the apparatus merely by adding together the reference temperature $T_{ref}$ and the value of the temperature rise ΔT.

The temperature value T is sent to a microcomputer 24 whose memory contains tables of functions for the state of the gas in the apparatus, in the form:

$$\rho = F(T,P)$$

These state functions are well known and tabulated. (See in particular: equations of Beattie, Bridgmann, Döring, etc. which take account in particular of the phenomenon of liquefaction, as cited in Doring, R., "Schwefelhexafluorid (SF6)", Dampftafel in internationalen Einheitensystem, Kali-Chemie informiert. 10/1979.)

Pressure P is provided by a pressure-measuring member 25 connected to the apparatus to be monitored.

The method can be improved by taking account of the thermal time constant of the apparatus.

When a current is applied to the set of bus bars or conductors in the apparatus, that causes the temperature of the apparatus to rise, and an equilibrium temperature is obtained only after a certain length of time starting from when the current was established. The duration of this length of time, i.e. the thermal time period, depends on the reference temperature.

Figure 2A:
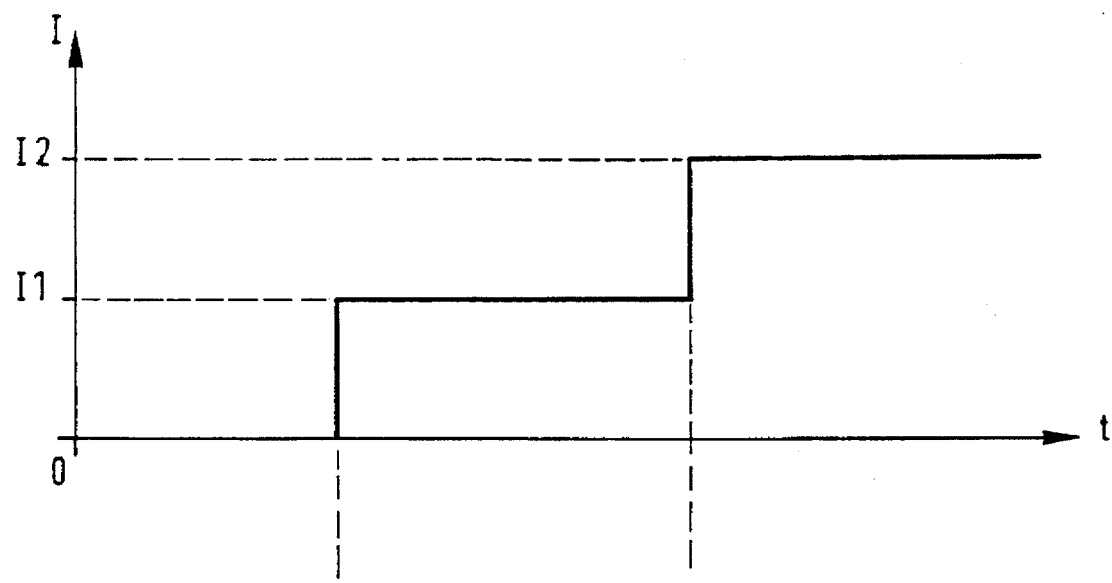
FIG. 2 shows variations in gas temperature rise as a function of sudden variations in current, showing the thermal time constants of apparatuses.
Figure 2B:
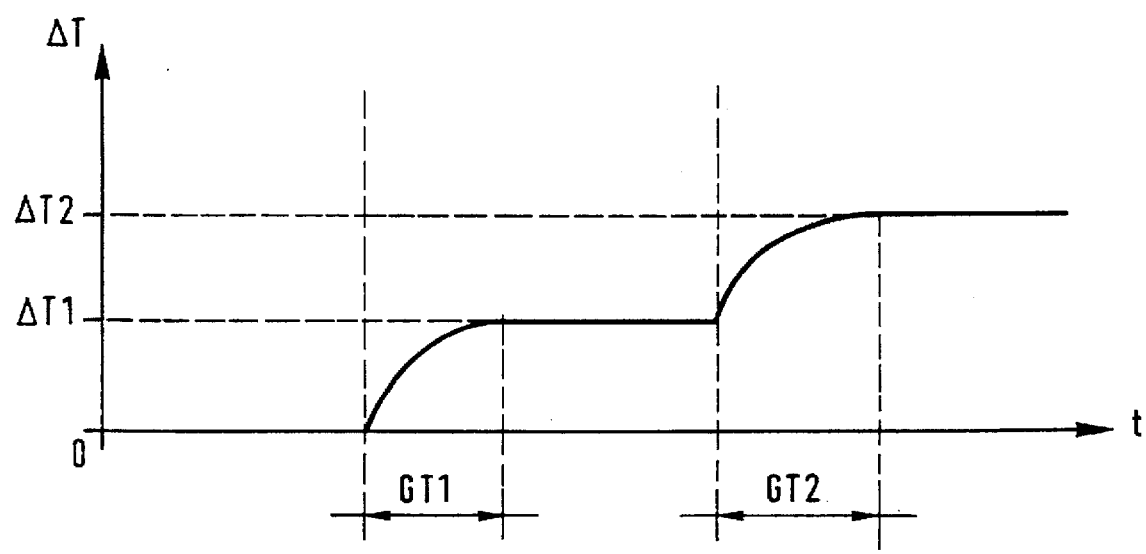

FIG. 2A shows variations in current, starting from a value 0, rising to a value $I_1$, and then to a value $I_2$: curve 2B shows the appearance of the curve for temperature rise ΔT which takes successive values $\Delta T_1$ and $\Delta T_2$ with thermal time periods $G_{T1}$ and $G_{T2}$ that are a function both of current and of temperature differences.

If the reference temperature is that of the case containing the gas (as applies to a metal-clad station) the thermal time period is independent of weather conditions (wind, snow, etc. . . . ). It can be taken into account in the correction algorithm, so computing temperature rise then makes use of slow time variations in current.

However, if the reference temperature is not the temperature of the case, then the thermal time period is going to depend on weather conditions; to take account of this parameter, a preferred means is to use a "thermal image" probe 17 for the volume to be monitored, the shape and the location of the probe causing it to have the same sensitivity to bad weather as the volume that is to be monitored. The computing program in the microprocessor 15 takes account of the information provided by the probe 17.

In a variant, and in order to avoid implementing equipment that is complex for measuring weather conditions, a disposition of the algorithm makes it possible to inhibit alarm and locking commands relating to the programmed threshold for a period of time following any significant variation of the current, which period is a function of the thermal time constant.

A variation of the current is considered as being significant if, under steady conditions, it gives rise to a change in the temperature which is greater than that determined by the degree of accuracy required.

In general, the member 25 providing information about the pressure P is an electronic sensor. The accuracy thereof must be compatible, over the entire range of gas temperatures of the apparatus in operation, with the objectives concerning accuracy of gas density measurement.

Commonly-used pressure sensors require a correction which can be implemented by providing the pressure sensor with a temperature sensor that controls a compensation circuit.

A cheaper variant consists in thermostating the pressure sensor by means of a thermally insulating enclosure containing one or more automatically regulated heater elements, or in fitting the transducer constituted by the pressure sensor and its associated electronic circuit with an automatically regulated heater device.

Figure 3:
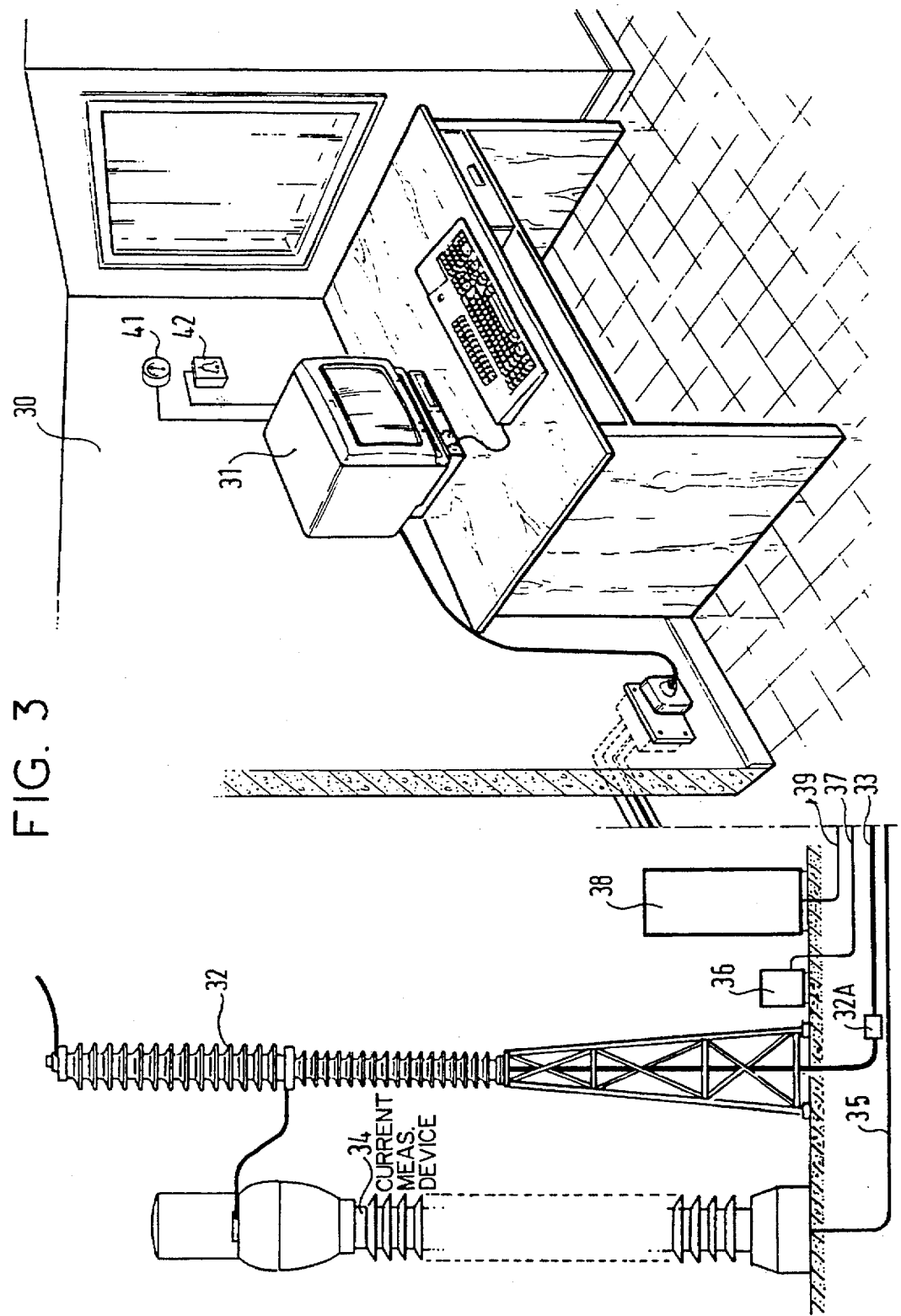
FIG. 3 is a pictorial view of the system for measuring the density of the insulating gas in a conventional circuit breaker situated in the open air.

FIG. 3 shows one way of implementing the method of the invention.

A microprocessor 31 is located in premises 30 and is programmed to compute the temperature rise $\Delta T$ on the basis of temperature and current values and to compute the density on the basis of the equation of state for the gas.

In the example of FIG. 3, the apparatus is a conventional $SF_6$ circuit breaker, of which an insulator 32 of only one phase has been drawn.

A pressure sensor 32A provides the microprocessor with the pressure value P via an appropriate link 33.

A current measurement device 34 provides a measure of the current conveyed by the phase in question via a link 35.

A temperature measuring device 36 placed at the foot of the circuit breaker column delivers the reference temperature $T_{ref}$ which is conveyed by a link 37.

Finally, a probe 38 that provides the thermal image of the circuit breaker and which is disposed in the vicinity thereof, supplies the microprocessor with information concerning variations in the temperature of the circuit breaker; this information is conveyed by a link 39.

Finally, the apparatus has signalling and alarm members represented by pictograms 41 and 42.

The invention is not limited to the example described. In particular, without going beyond the ambit of the invention, it is possible to modify details and to replace certain means by equivalent means.

We claim:

1. A method of determining the density of an insulating gas in electrical apparatus in the vicinity of parts carrying electrical current, the method comprising the following steps:

a) a reference temperature is measured outside the apparatus and in the vicinity thereof;

b) the current passing through the apparatus is measured, and the temperature rise of the gas above the reference temperature is determined on the basis of gas temperature rise values as a function of current values and of various reference temperatures, said temperature rise values having been previously determined by testing or by a mathematical model;

c) the gas temperature T is computed by adding the reference temperature and the temperature rise;

d) the gas pressure P inside the apparatus is measured; and e) the density $\rho$ of the gas is computed on the basis of equations of state of the gas $\rho=F(T,P)$ which equations are tabulated data.

2. A method according to claim 1, wherein the temperature rise value is corrected to take account of the open or closed state of section switches disposed in the same circuit as the apparatus.

3. A method according to claim 1, wherein the temperature rise value is corrected to take account of weather conditions.

4. A system for determining the density of an insulating gas in electrical apparatus in the vicinity of parts conveying current, the system comprising:

a temperature sensor placed in the vicinity of the apparatus and delivering a reference temperature;

a device for measuring the currents passing through the apparatus;

links for conveying the reference temperature value and the current values to a microprocessor programmed to provide the temperature rise of the gas above the reference temperature as a function of the current values and for various reference temperatures, such temperature rise values having been previously determined by tests or by a mathematical model, the microprocessor being programmed to add together the reference temperature and the temperature rise value in such a manner as to obtain the corrected temperature value of the gas;

a device for measuring the pressure of the gas in the apparatus;

a link for conveying the value of the pressure in the apparatus to the microprocessor, the microprocessor being programmed to provide the value of the density of the gas on the basis of the equations of state for the gas which are stored in a memory of the microprocessor; and signalling and alarm means operated by the microprocessor whenever the computed value for the density drops to one or more threshold values.

5. A system according to claim 4, further comprising a probe which provides an output representing a thermal image of the apparatus and is placed in the vicinity thereof, said microprocessor making an additional correction to the computed value of the density, in accordance with said output, to take into account variations in an environment in which said electrical apparatus is disposed.

6. A system according to claim 4, wherein the microprocessor is programmed to inhibit the alarm and signalling commands for a predetermined length of time after a sudden increase or decrease in the current by a given amount.

7. A system according to claim 4, wherein the pressure-measuring device is a sensor associated with a temperature-compensated electronic circuit.

8. A system according to claim 4, wherein the pressure-measuring device is thermostatically controlled.

* * * * *